Aug. 20, 1946.  A. PIPPING  2,406,101
AMPOULE SEALING MACHINE
Filed April 7, 1943  5 Sheets-Sheet 5

INVENTOR.
Alf Pipping
BY
Clark + Ott
ATTORNEYS

Patented Aug. 20, 1946

2,406,101

UNITED STATES PATENT OFFICE 2,406,101

AMPOULE SEALING MACHINE

Alf Pipping, Bloomfield, N. J.

Application April 7, 1943, Serial No. 482,196

5 Claims. (Cl. 49—7)

This is an invention for a machine for sealing ampoules or equivalent containers of fusible material such as glass after the same have been filled.

Due to the fact that ampoules of the same capacity vary considerably in the outside diameter of the necks thereof, it is essential in sealing the same by the direct action of a flame jet impinged thereagainst that the length of time to which the neck is subjected to the heat of the flame jet be regulated to within precise and very narrow limits to avoid damage to the ampoule and waste of the contents. When the fusing and sealing are carried out by and depend upon the judgment of an operator, only those of experience and possessing a high degree of skill can perform this type of work satisfactorily.

The present invention comprehends a machine of the character set forth and for the purpose specified which functions to automatically fuse and seal one or a plurality of ampoules simultaneously and which machine is so constructed and arranged and so actuated as to apply the heat to the neck of each individual ampoule for precisely the length of time required to obtain the proper fusing and sealing thereof in accordance with the diameter of the neck of each ampoule, thereby practically eliminating damage thereto or waste of the contents by faulty sealing.

The invention is further directed to a machine of the indicated character by virtue of which a plurality of ampoules may be expeditiously emplaced therein for fusing and sealing and removed therefrom when sealed so as to materially increase the output over that heretofore possible while at the same time permitting of the employment of less skilled operators than previously.

The invention also resides in a novel means for effecting the application of the flame jets to the ampoules and the discontinuance of the same thereto, together with means governed by the size of the outside diameter of the neck of each individual ampoule for controlling the time of application of said jets in order to insure proper fusing and sealing thereby avoiding considerable waste.

As a still further feature, the invention embodies in combination with means for supporting one or more ampoules in fixed position and means for heating the same to effect the softening and fusing thereof, means for compressing the necks of the ampoules while in a plastic state for insuring positive sealing of the same.

Other objects of the invention reside in the novel mode of supporting and retaining the ampoules in position for sealing, the facility with which they may be emplaced in and removed from the machine, the means for compensating for the variation in the size of the ampoules which may be sealed by the machine and the manner in which the parts of the machine subjected to the heat of the flame jets are cooled to protect the same against damage by overheating.

With the above enumerated and other objects in view, the invention is set forth in greater detail in the following specification, particularly pointed out in the appended claims and illustrated in the accompanying drawings, in which:

Fig. 4 is a similar view showing the machine in operation with the flame jets being applied to the ampoule necks.

Referring to the drawings by characters of reference, the machine includes a base 10 which has secured to the upper surface thereof a pair of transversely spaced upstanding supporting brackets 11 and 12 between which extends a horizontal cross bar 13 located above the base and which has secured to the under side thereof a transverse duct 14 for a cooling fluid which is fed therethrough from an inlet 15 and which is discharged therefrom to an outlet 16.

Attached to the forward face of the duct 14 is an ampoule neck positioning strip 17 of angulated cross-sectional shape, defining a horizontal forwardly projecting lower flange 18, the forward edge of which flange is provided with a longitudinal series of contiguous V-shaped notches 19 of a size to receive therein and space apart respectively the necks of a row of ampoules, the upper forward portion of the notched edge of the lower flange being cut-away or rabbeted to provide a clearance space for a purpose which will hereinafter appear.

The filled ampoules A are delivered to the operator of the machine in a rack B which as illustrated in the present disclosure is in the form of an elongated rectangular block formed with a plurality of longitudinally spaced sockets C opening through the upper face thereof and which sockets are of a size to freely receive the lower end portions of the ampoules A, thereby disposing the same in a row in the rack. Secured to the upper surface of the base 10 and located between the supporting brackets 11 and 12, is a guideway for the ampoule rack B which consists of spaced parallel forwardly and rearwardly extending side guide strips 20, the forward ends of which are disposed adjacent the forward edge of the base and the rear ends of which terminate in substantially vertical alignment with the forward face of the cross bar 13. A rear abutment strip 21 extends transversely of the base from one side guide strip 20 to the other and the forward ends 22 of the side guide strips are bent outwardly at diverging angles to define a flared entrance mouth for facilitating the initial emplacement of the ampoule rack B within the guideway between the side guide strips 20.

In order to render the machine useful for ampoules of varying heights within limits, shim blocks 24 of varying thicknesses are arranged within the guideway and removably anchored in place by screws 25 threaded into the base. Under this construction and arrangement, it will be apparent that the operator of the machine may expeditiously place the racks B on the shim block within the flared entrance mouth of the guideway and slide the same rearwardly between the side guide strips 20 until the rack engages the rear abutment strip 21. This automatically disposes the upper ends of the ampoule necks respectively within the V-shaped notches 19 of the lower flange 18 of the neck positioning strip 17.

The necks are clamped within the notches 19 by a series of spring fingers 27 which are secured tangentially to and depend from a horizontally disposed overhead rock shaft 28 extending transversely of the machine with the opposite ends thereof journaled in bearing openings in the supporting brackets 11 and 12, the end of the rock shaft which extends through the bracket 12 having secured thereto an L-shaped lever for turning the rock shaft manually and which lever is provided with a weight 30 at the terminal of one of its arms which functions to turn the rock shaft in a direction to swing the spring fingers 27 forwardly and upwardly to an inactive out-of-the-way position where further movement of the lever is arrested by engagement of the same with a stop pin 31 on the bracket 12. The lever 29 is provided with a latch 32 adapted to engage a keeper 33 on the bracket 12 for retaining the lever in its forward position with the fingers actively engaging the ampoule necks. The cutaway or rabbeted portion of the flange 18 serves as a clearance space for the lower terminals of the spring fingers to permit the same to push the ampoule necks rearwardly to the full extent within the V-shaped notches 19 in accordance with their outside diameters and to retain them in fixed position under the tension of the spring fingers.

In order to heat and fuse the necks of the ampoules A for sealing the same, a pair of nozzles 35 and 36 are provided for each ampoule for directing chisel-shaped flame jets against the necks between the ends thereof and in surrounding relation thereto. The nozzles 35 and 36 are carried by the terminals of conduit pipes 37 and 38 secured to, communicating with and leading from a gas manifold 39 extending transversely of the machine and supported by a transverse strip 40 secured to the upper surface of the base 10, said manifold being supplied with gas from a suitable source by a pipe P. The nozzles 35 and 36 are disposed in staggered relation, with the flame jets of the pair of nozzles for each ampoule directed at an angle to the axes of the nozzles to thereby afford a clearance between the forward nozzles of adjacent pairs to allow for the passage of the ampoule necks therebetween.

Any suitable means may be employed for permitting of the application of the flame jets from the nozzles 35 and 36 and for discontinuing the same but, as shown in the present instance, pneumatic means is utilized which consists of an air manifold 45 extending transversely of the machine and supported above the base adjacent the rear thereof. Air under pressure is supplied to the manifold 45 through an inlet pipe 46 and a plurality of outlet pipes 47, one for each ampoule extend forwardly from the air manifold 45 with the forward closed end portions thereof respectively disposed adjacent to and slightly below each pair of nozzles 35 and 36. The forward end portion of each outlet pipe 47 is provided with a pair of upwardly directed outlet openings 48 and 49 for directing air jets respectively in intersecting relation to the flame jets of the nozzles 35 and 36 so as to deflect the flame jets upwardly away from the ampoule necks, to thereby discontinue the action of the flame jets thereagainst.

In order to permit the flame jets to be projected in their normal paths so as to heat and fuse the ampoule necks, each air outlet pipe 47 is severed and separated to provide a space or gap 50 which permits a valve lug 51 to be disposed in each space or gap 50 for the purpose of intercepting the air pressure fed therethrough from the manifold 45. The valve lugs 51 are each carried by a leaf spring 52 anchored at its forward end to the strip 40 and extending rearwardly therefrom beneath the air outlet pipe 47 with the rear portion of said leaf spring directed downwardly and formed with a substantially horizontal terminal 53 overlying the upper horizontal flange 54 of an angle strip 55 disposed transversely of and supported above the base adjacent the rear thereof by transversely spaced upstanding brackets 56 and 57. The resiliency of the springs is such as to normally swing the rear terminals 53 upwardly to thereby dispose the valve lugs 51 within the spaces or gaps 50 of the air outlet pipes 47 to intercept the air pressure and permit the flame jets to be projected in their active paths toward and in surrounding relation to the ampoule necks.

For the purpose of holding the springs 52 depressed against the horizontal flange 54 of the angle strip 55 with the air pressure flowing through the air outlet pipes 47 whereby the flame jets are deflected upwardly, a plurality of rack bars 60 are provided one for each spring 52. The rack bars are mounted for vertical sliding movement in aligned guide openings 61 and 62 formed in superposed bearing strips 63 and 64 extending transversely of the machine and secured to the upstanding brackets 56 and 57. The lower ends of the rack bars respectively rest upon the terminals 53 of the leaf springs 52 to thereby hold the springs depressed and against the flange 54 so that the valve lugs are inactive and the flame jets are deflected.

In order to raise each rack bar 60 to permit its spring 52 to be flexed upwardly for moving the valve lug 51 into the space or gap 50 so that the flame jets will be applied for a length of time required in accordance with the outside diameter measurement of each ampoule, a vertically swingable arm 67 is provided for each rack bar. Each arm 67 is attached to a gage head 68 and extends rearwardly therefrom with the terminal 69 at the rear thereof disposed adjacent and alongside of the teeth 70 formed on each rack bar 60. The gage heads 68 are respectively mounted for swing movement on horizontal axes 71 journaled in bearing elements 72 attached to the forward face of the cross bar 13, so that one gage head is located in rear of each spring finger 27 for pivotal movement between each adjacent pair of bearing elements. By virtue of this arrangement it will be apparent that the weight of the rearwardly projecting arms 67 functions to normally swing the lower ends of the gage heads forwardly. It therefore follows that when the spring fingers 27 engaging the ampoule necks contact with the lower ends of the gage heads 68, said gage heads will be selectively swung rearwardly varying distances commensurate with the sizes of the outside diameters of the ampoule necks. This will in turn set the rear terminals 69 of the arms 67 at varying heights alongside of the teeth 70 of the rack bars 60, it being apparent that the ampoule necks of larger outside diameters will dispose the spring fingers 27 farther forward than those of smaller outside diameters, hence the rear terminals 69 of the arms 67 corresponding to the smaller ampoule necks will be set at a higher level than the rear terminals of the arms of the larger size ampoule necks. It will also be appreciated that due to the leverage arm proportions thus defined the relatively longer length of the arms 68 with reference to the length of the lower ends of the gage head will greatly magnify the relative differences between the outside diameters of the ampoule necks as evidenced by the variations in the vertical settings of the arm terminals 69.

Figure 2:
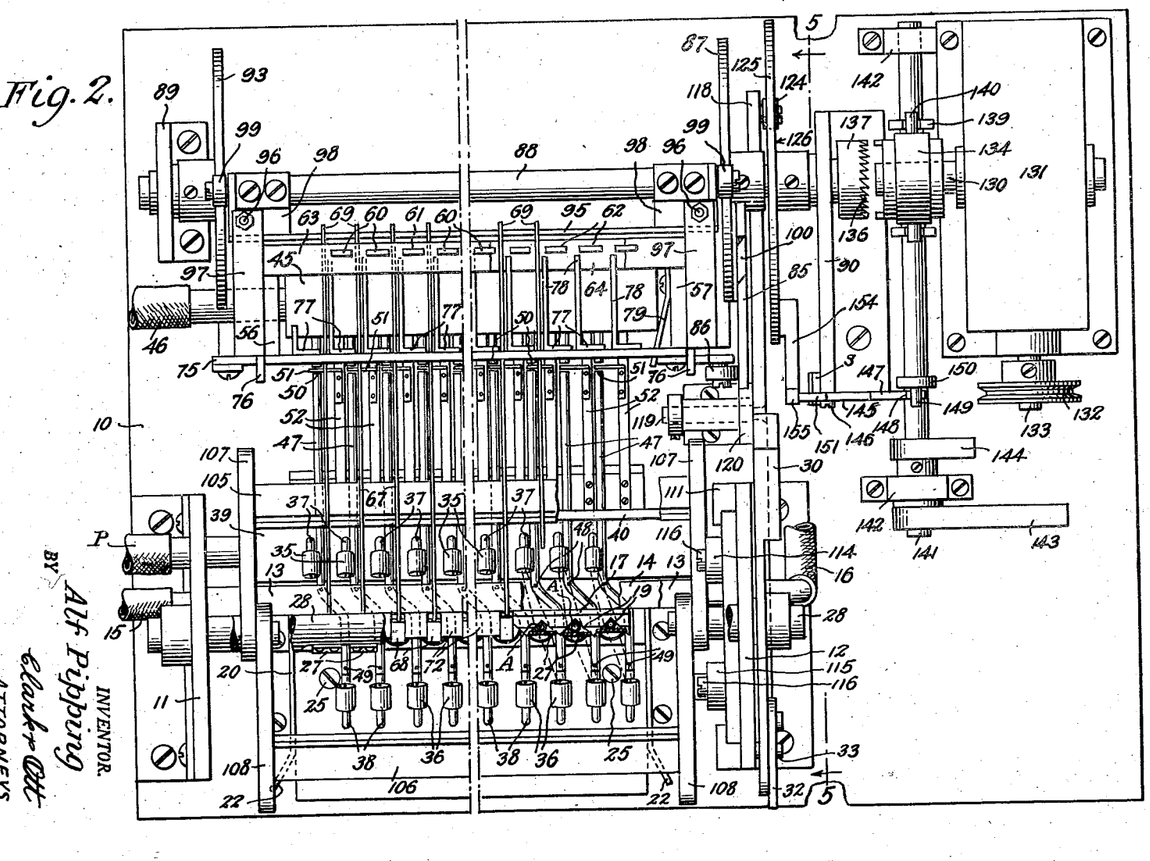
Fig. 2 is a plan view thereof with portions broken away.
Figure 3:
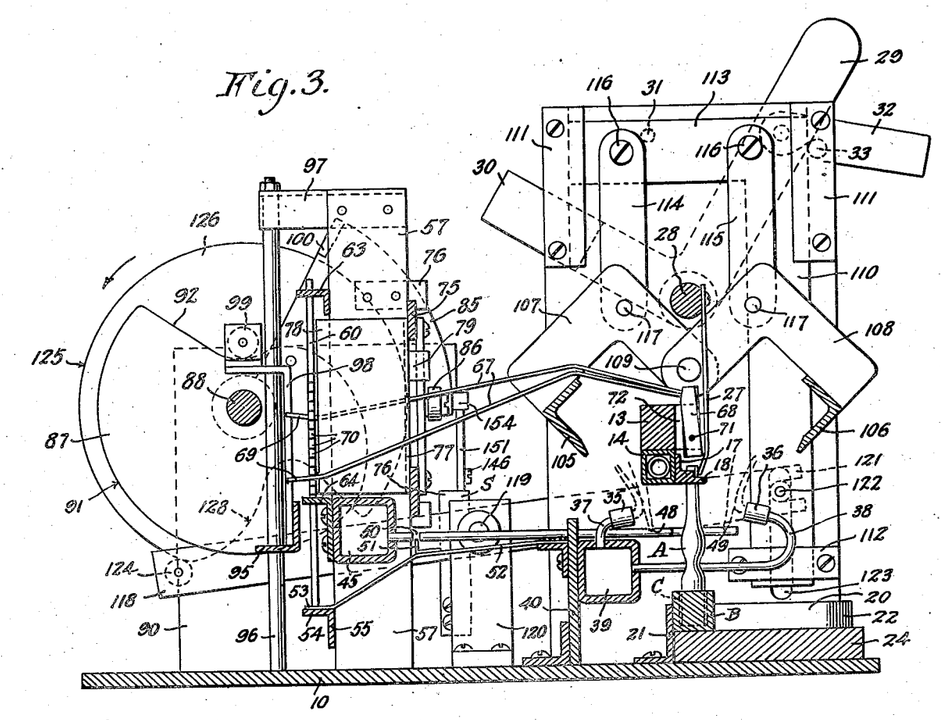
Fig. 3 is a vertical sectional view through the machine taken approximately on the line 3—3 of Fig. 1, illustrating the flame jets inactive and showing the gage heads and their arms set at relatively different positions with reference to the rack bars for varying the time of application of the flame jets.
Figure 5:
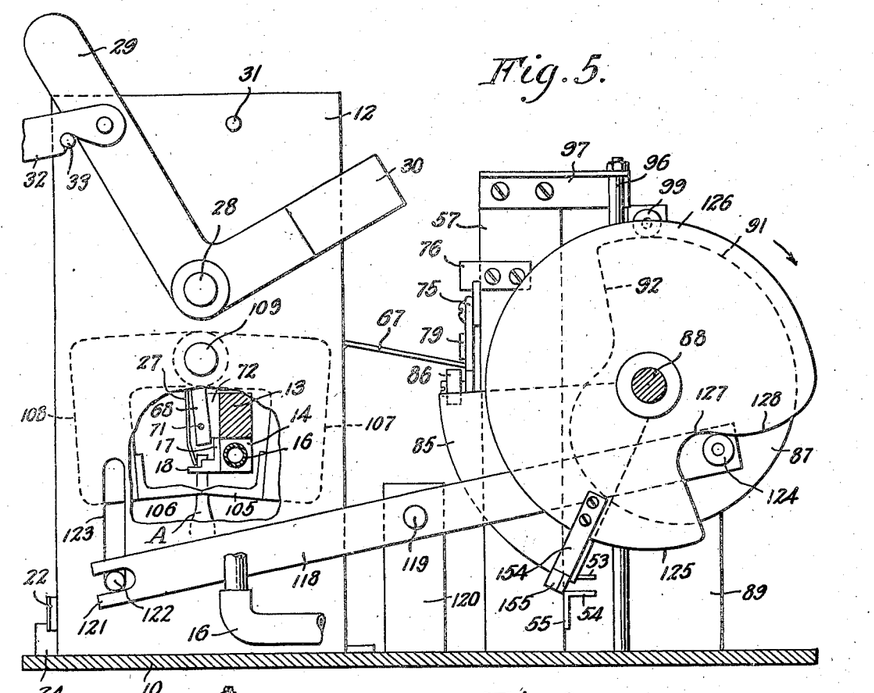
Fig. 5 is a vertical sectional view taken approximately on the line 5—5 of Fig. 2, illustrating the position of parts at a subsequent stage of the cycle of operation of the machine and showing the neck squeezing jaws in their active position.
Figure 6:
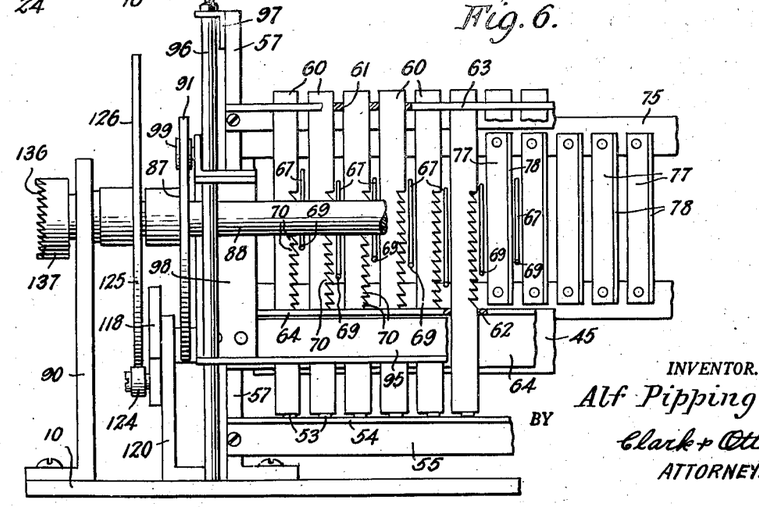
Fig. 6 is a fragmentary rear view of the machine.

In order to shift the rear terminals of the arms 67 laterally into engagement with the rack teeth 70 of the rack bars 60, after said terminals have been set in accordance with the neck sizes of the ampoules, a frame 75 is provided which is mounted for lateral shifting movement in guides 76 attached to the upstanding brackets 56 and 57 and said frame has secured thereto a plurality of vertically disposed transversely spaced angle bars 77 between which the arms 67 respectively extend so that lateral movement of the frame will effect corresponding movement of the rear portions of the arms coincident therewith to engage the rear terminals 69 thereof with the rack bar teeth 70 when the frame is shifted to the right, as viewed in Fig. 2. In order to insure positive disengagement of the arm terminals 69 from the rack teeth, each of the angle bars 77 has the rear portion of its rearwardly directed flange 78 disposed closely adjacent to the rear terminal of the arm at the region where it engages the teeth of the rack bar. A leaf spring 79 anchored to the bracket 57 engages the side rail of the frame 75 for normally shifting the frame to the right and for tensioning the same against movement to the left, as viewed in Fig. 2. A sector shaped cam 85 is mounted for rotation on an axis parallel to the plane of movement of the frame 75 and is engaged by a cam roller 86 carried by the frame 75 to shift the frame to the left against the tension of the spring 79. The cam 85 is secured to a cam disk 87 keyed to a cam shaft 88 extending transversely of the machine adjacent to the rear of the base 10 and journaled for rotation in upstanding bearing brackets 89 and 90 secured to the upper surface of the base 10. The cam disk 87 is formed with a spiroidal periphery 91 which merges into a tangential edge 92 and is so generated as to gradually increase in distance from its axis of rotation in the direction in which it turns from its juncture with the inner end of the tangential edge 92 to its juncture with the outer end thereof. The cam disk 87 together with a complementary cam disk 93, identical with the cam 87, effects vertical movement of an angle bar 95 extending transversely of the machine beneath the terminals 69 of the arms 67 and which angle bar 95 is mounted for vertical guided movement by guide rods 96 extending upwardly from the base 10 and supported at their upper ends by angle elements 97 secured to and projecting rearwardly from the upper ends of the bearing brackets 56 and 57. Attached to the opposite ends of the angle bar 95 and also guided for vertical movement are a pair of upstanding arms 98 each of which has journaled thereon a cam roller 99 which cam rollers are respectively engaged by the cams 87 and 93, so that upon each complete rotation of the cam shaft 88 the cams 87 and 93 will effect the raising and lowering of the angle bar 95. The sector shaped cam 85 and the cam disks 87 and 93 are so related or positioned with reference to each other that as they turn in a counter clockwise direction as viewed in Fig. 3 the trailing edge of the cam 85 passes beyond the cam roller 86 just as the low point of the cam disk peripheries of the cams 87 and 93 start to engage the cam rollers 99. This insures the lateral shifting of the frame 75 and the engagement of the rear terminals 69 of the arms 67 with the teeth 70 of the rack bars 60 immediately prior to the raising of the angle bar 95. As the angle bar 95 moves upwardly it will contact the terminals 69 of the arms 67, it being apparent that the terminals which are disposed lowermost will be raised first to cut off the air pressure jets and permit the flame jets to be impinged against the ampoule necks which obviously are those of larger outside diameter. As the angle bar 95 continues to ascend it will engage with the other arm terminals successively, it being apparent that those which are disposed highest will be engaged last and hence the flame jets permitted to impinge against the ampoule necks of smaller outside diameter subsequent to those of larger diameter. When the cam disks 87 and 93 have completed a rotation the tangential edge 92 registering with the cam rollers 99 will permit the angle bar 95 to descend rapidly thereby lowering the angle bar 95 to its initial lower position. At this stage of the operation, the beveled leading edge 100 of the sector shaped cam 85 will contact with its cam roller 86 to cam the frame 75 to the left, instantly releasing all of the arm terminals 69 from the teeth 70 of the rack bars 60 so that the same descend and gravitationally depress all of the leaf springs 52 thus moving the valve lugs 51 out of the gaps 50. This instantly causes the air to flow through the air outlet pipes 47 and through the upwardly directed outlet openings 48 and 49 for directing the air jets respectively in intersecting relation to the flame jets thereby discontinuing the action of the flame jets against the ampoule necks. It thus follows that means has been devised which, governed by the size of the outside diameter of the neck of each individual ampoule, controls the length of time the flange jets are applied commensurate with the outside diameters so as to fuse and seal the ampoules.

In order to insure a positive sealing of each ampoule, means is provided for squeezing or biting the ampoules while they are in a plastic state. This means consists of a pair of jaws 105 and 106 which extend transversely of the machine between the supporting brackets 11 and 12 and which are respectively carried by a pair of bell crank lever arms 107 and 108, one at each end of each arm. The bell crank arms at each end of the jaws are pivotally connected by a pivot 109 to each other and to the supporting brackets 11 and 12 to swing the jaws simultaneously toward each other into engagement with the ampoule necks at a level immediately above the flame jets. This compresses or squeezes the necks while in a plastic condition and insures an effective closing and sealing of the ampoules. The means for actuating the jaws 105 and 106 to close and open the same consists of an L-shaped slide 110 which is mounted for vertical movement in upper and lower guides 111 and 112 on the inner face of the supporting bracket 12. The upper horizontal leg 113 of the slide 110 is connected to the bell crank lever arms 107 and 108 by links 114 and 115 which are pivoted at their opposite ends respectively to the leg 113 and to the lever arms by pivots 116 and 117. Vertical sliding movement is imparted to the L-shaped slide 110 by a rock lever 118 which is fulcrumed at 119 to a bearing bracket 120 secured to the upper surface of the base 10. The forward terminal of the rock lever 118 is bifurcated as at 121 and engages a lateral outwardly projecting pin 122 on the vertical leg of the L-shaped slide 110, which pin protrudes through a slot 123 in the supporting bracket 12. The opposite or rear end of the rock lever 118 has journaled thereon a cam roller 124 which is engaged by the periphery 125 of a cam disk 126 secured to the cam shaft 88. The cam disk 126 is provided with a notch 127 which functions to permit the slide 110 to gravitate or move downwardly for swinging the jaws 105 and 106 toward each other in timed relation to and immediately following the cutting off of the flame jets and while the necks are still in a plastic state. The notch is formed with a convex following wall 128 which serves to subsequently cam the rear end of the rock lever 118 downwardly and swing the forward end thereof upwardly to thereby raise the L-shaped slide 110, thus effecting the swinging of the jaws 105 and 106 to opened relation.

Any suitable means may be employed for imparting rotation to the cam shaft 88 but as herein disclosed the means is shown as consisting of a driven shaft 130 protruding from the housing 131 of a reduction gearing (not shown) driven from any suitable power source by a pulley 132 on a power input shaft 133 extending into the housing. The driven shaft 130 has splined thereto an axially shiftable clutch collar 134 formed with one or more clutch teeth 135 adapted to mesh with the clutch teeth 136 of a fixed clutch member 137 keyed to the end of the cam shaft 88. A shifting fork 138 having notched terminals 139 engages the diametrically projecting trunnions 140 on the clutch collar 134 and said fork is secured to and extends radially upward from a rock shaft 141 journaled in bearings 142 secured to the upper face of the base 10. A manipulating lever 143 is secured to the forward end of the rock shaft 141 and is canted in all positions thereof so as to also serve as a means for weighting the rock shaft to turn the same in a direction for normally shifting the clutch collar 134 away from the clutch member 137 to disengage the clutch teeth 135 and 136. The gravitational movement of the lever 143 is arrested by a stop lug 144 secured to the rock shaft and engageable with the base 10.

Figure 1:
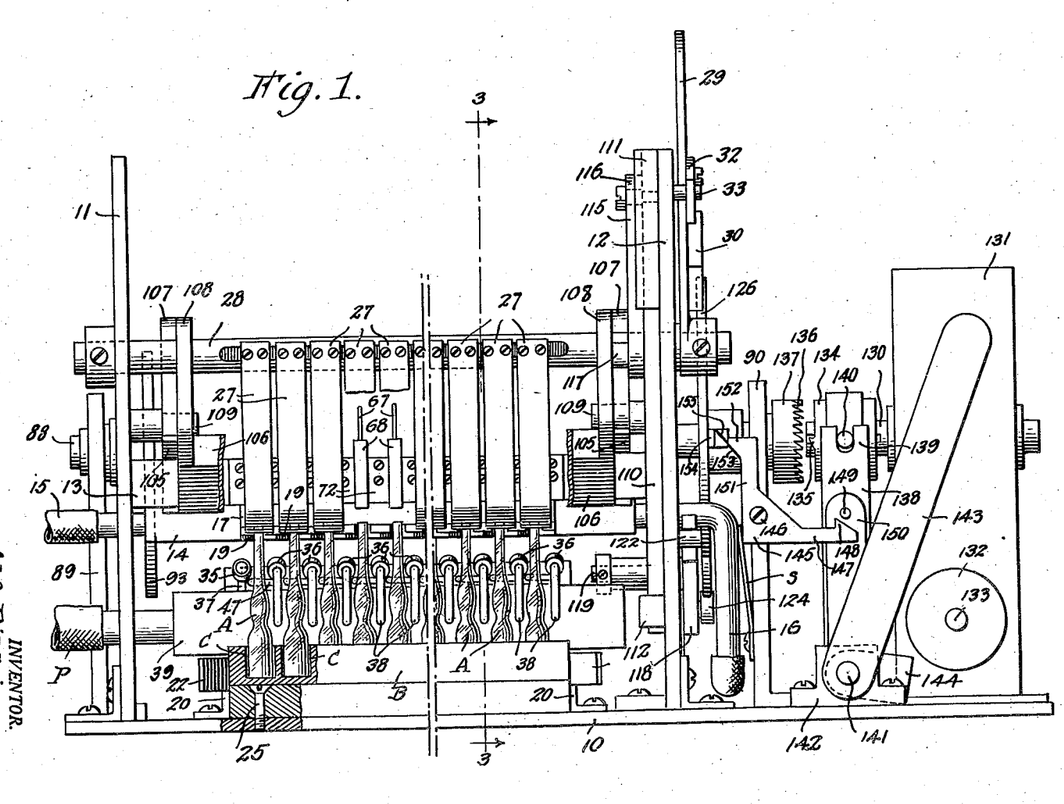
Fig. 1 is a front view of an ampoule sealing machine constructed in accordance with the invention with portions broken away to show the underlying structure with the ampoules clamped in place and illustrating the position of parts immediately prior to the starting of the machine.

Mechanism is provided for retaining the clutch means in active coupled relation after the same have been engaged by the operator and to automatically uncouple the clutch means after a single revolution of the cam shaft 88 which completes the cycle of operation of the machine. This mechanism consists of an angulated element 145 which is fulcrumed on a pivot pin 146 carried by the bearing bracket 90. The element 145 includes a lower horizontal latch arm 147 having a detent bill 148 which is normally urged by a spring S into engagement with a keeper pin 149 carried by a radial arm 150 secured to the rock shaft 141, when the manipulating lever 143 is swung to the left as viewed in Fig. 1 to start the machine. The angulated element 145 also includes a vertical latch release arm 151 having a projection 152 at its free terminal, which projection is formed with a beveled face 153 disposed in the path of movement of a trip finger 154 formed with a complementary beveled face 155. The trip finger 154 is secured to and projects radially outward from the cam 126, so that when the operator swings the manipulating lever 143 to the left to engage and couple the clutch means the keeper pin 149 will be disposed slightly to the left of the detent bill 148 of the latch arm 147. The cam shaft 88 will then start to turn in a counterclockwise direction as viewed in Fig. 3 and immediately following this initial turning movement it will be apparent that the trip finger 155 will have cleared the projection 153 of the release arm 151 thereby causing the latch arm 147 to be urged upwardly so that the detent bill 148 will engage behind the keeper pin 149 of the arm 150. This detains the clutch means in coupled relation until the cam shaft and cams have completed a revolution and the cycle of operation of the machine. At this stage, the beveled face 155 of the trip finger 154 will have engaged the beveled face 153 of the projection 152 of the trip arm 151 to swing the latter to the right, thus lowering the latch arm 147 sufficiently to release the keeper pin 149 from the detent bill 148. Thus released, the weight of the manipulating lever 143 will turn the rock shaft 141 in a clockwise direction as viewed in Fig. 1, which in turn swings the shifting fork 138 to the right thereby shifting the clutch collar 134 to the right to uncouple the same from the clutch element 137 of the cam shaft.

In use and operation, the racks B containing the filled ampoules A are delivered to the operator of the sealing machine who places the racks in the guide-way as previously described. It will be understood that the spring fingers 27 which clamp the ampoule necks in the notches 19 will have been raised before the rack is positioned in the guideway against the rear abutment strip 21. The operator then swings the L-shaped lever 29 to the right as viewed in Fig. 3 to engage the lower terminals of the spring fingers 27 with the ampoule necks thereby clamping the same firmly in the V-shaped notches 19, it being understood that the resiliency of the fingers 27 will permit them to individually flex to accommodate themselves to varying positions in accordance with the sizes of the outside diameters of the ampoule necks. The lever 29 is retained in its forwardly swung position by the engagement of the latch 32 with the keeper pin 33. As soon as the ampoules have been positioned and clamped in place the gage heads 68 will be selectively swung rearwardly varying distances commensurate with the sizes of the outside diameters of the ampoule necks thus setting the rear terminals 69 with reference to the teeth of the rack bars 60. At this time it will be understood that all of the rack bars 60 are in their lowermost positions depressing the leaf springs 52 so that the valve lugs 51 are in lowered positions allowing the air pressure to flow through all of the outlet pipes 47 and from the upwardly directed outlet ports 48 and 49 so that air jets are intercepting the flame jets and deflecting the same upwardly and away from the ampoule necks until the machine is started on its cycle of operation. The operator then starts the machine as previously explained by swinging the manipulating lever 143 to the left, thereby coupling the cam shaft 88 with driven shaft 130 from the power source. The initial movement of the cam shaft 88 causes the trailing edge of the sector shaped cam 85 to move out of contact with the cam roller 86 thereby permitting the leaf spring 79 to urge the frame 75 to the right as viewed in Fig. 2, thus shifting the rear terminals 69 of the arms 67 into engagement with the teeth 70 of the rack bars 60. At the same time the spiroidal peripheries of the cam disks 87 and 93 engaging the cam rollers 99 will start the angle bar 95 in its upward movement to gradually pick up and raise the rear terminals 69 of said arms 67. This will raise the rack bars 60 with the teeth of which they have been engaged so as to cut off the air pressure flowing from the manifold 45 through the air outlet pipes 47 until the cam disks 87 and 93 have been turned to a position where the tangential edges 92 thereof permits the cam rollers 99 to descend to their lowermost positions thereby lowering the angle bar 95. However, immediately prior to this, the beveled leading edge 109 of the cam 85 will have engaged the roller 86 and the frame will thus have been shifted to the left, thus disengaging the terminals 69 from the teeth 70, freeing the rack bars 60 to descend and depress the leaf springs 52 thereby permitting the air to flow through pipes 47 to discontinue the flame jets against necks. It will be evident from the construction and mode of operation set forth that the length of time which the flame jets are applied to the individual ampoules in accordance with the size of their outside diameters, is controlled by starting the application of the flame jets to the ampoules at varying times and discontinuing the application of said flame jets simultaneously. That is, the larger the outside diameter of the ampoule neck, the earlier the flame jets are applied thereto and the smaller the outside diameter, the later the flame jets will be applied.

During the initial and major portion of the cycle of rotation of the cam shaft 88, the cam roller 124 is engaged by the concentric periphery 125 of the cam disk 126 so that the rear end of the rock lever 118 is depressed to elevate the forward bifurcated end 121, thereby retaining the L-shaped slide 110 in its raised position and holding the jaws 105 and 106 in their opened relation. When the cam disk 126 approaches the completion of its cycle the notch 127 registers with the cam roller 124 and the leading substantially radial edge permits the cam roller 124 to move upwardly as the forward end of the lever 118 descends under the weight of the L-shaped slide 110 to close the jaws. The final stage of the cycle of rotation of the cam disk 126 causes the following or trailing convex wall 128 to cam the rear end of the rock lever 118 downwardly for effecting the opening of the jaws after they have performed their function. During the final stage of the cycle of operation of the machine the beveled leading edge 100 of the sector shaped cam 85 will contact with the cam roller 86 to cam the frame 75 to the left, thereby releasing all of the rear terminals 69 of the gage arms 67 from the teeth 70 of the rack bars 60.

At the precise moment when the cam shaft and cams have completed a single revolution the trip finger 155 functions to release the detent bill 148 from the keeper pin 149 to discontinue the operation of the machine. The operator then releases the latch 32 from the keeper 33 and the lever 29 swings rearwardly or counterclockwise as viewed in Fig. 3 until the lever engages the stop pin 31. This swings the spring fingers 27 forwardly and upwardly to an out-of-the-way position so that the operator may slide the rack B with the sealed filled ampoules A forwardly of the guideway and remove them from the machine for repeating the operation. After removing the rack B from the machine, the upper ends of the ampoule necks above the compressed sealed portions are readily brushed away or otherwise displaced.

What is claimed is:

1. A machine for simultaneously sealing the necks of a plurality of ampoules comprising a base having a guideway for receiving and locating in a predetermined position a rack containing a row of vertically disposed upstanding ampoules so that the row extends transversely of the machine, a cross rail carried by the base in superposed relation to the located rack and formed with longitudinally spaced V-shaped notches in the forward edge thereof within which the upper end portions of the ampoule necks are respectively arranged, flexible spring fingers movable against the upper ends of the necks when so arranged in the notches for clamping said necks in place, a gage head for each ampoule pivoted on a horizontal transverse axis and located adjacent each spring finger, a rearwardly directed arm secured to each gage head functioning as a weight for swinging the lower edge of the gage head against its adjacent spring finger so that the rear end portions of the arms assume varying vertical positions governed by the size of the outside diameters of the ampoule necks, nozzles for directing individual flame jets in surrounding relation to each ampoule neck, an air pressure pipe for each flame jet having outlets for directing air jets so as to intercept and discontinue the application of the flame jets, valves for cutting off the air to each air pressure pipe, means controlled by the vertical position of each arm for selectively closing the air valves to permit of the impingement of the flame jets against the ampoule necks and means for releasing said valve closing means to simultaneously open said air valves to discontinue the impingement of the flame jets against the ampoule necks.

2. A machine for sealing the necks of a plurality of ampoules simultaneously comprising a base having a guideway for receiving and locating in a predetermined position a rack containing a row of vertically disposed upstanding ampoules so that the row extends transversely of the machine, a cross rail carried by the base in superposed relation to the located rack and formed with longitudinally spaced V-shaped notches in the forward edge thereof within which the upper end portions of the ampoule necks are respectively arranged, flexible spring fingers movable against the upper ends of the necks when so arranged in the notches for clamping said necks in place, a gage head for each ampoule pivoted on a horizontal transverse axis and located adjacent each spring finger, a rearwardly directed arm secured to each gage head functioning as a weight for swinging the lower end of the gage head against its adjacent spring finger so that the rear end portions of the arms assume different vertical positions governed by the size of the outside diameters of the ampoule necks, nozzle for directing individual flame jets in surrounding relation to each ampoule neck, an air pressure pipe for each flame jet having outlets for directing air jets so as to intercept and discontinue the application of the flame jets, valves for cutting off the air to each air pressure pipe, means controlled by the vertical position of each arm for selectively closing the air valves to permit of the impingement of the flame jets against the ampoule necks, means for simultaneously releasing said valve closing means to open said air valves and thereby discontinue the impingement of the flame jets against the ampoule necks, and a pair of jaws operable in timed relation to the discontinuance of the impingement of the flame jets for pinching off the necks and closing the unsealed ones while the necks are in a plastic state.

3. In a machine for sealing filled ampoules made of a fusible material, means for supporting and retaining the ampoule in fixed position, a nozzle opening toward said ampoule for directing a flame in surrounding relation to the neck thereof, a conduit having an opening directed toward the path of the flame adapted to direct a jet of air for intercepting and discontinuing the application of the flame to the neck of the ampoule, means for cutting off the supply of the air passing through said conduit, a swingably mounted arm disposed with one end thereof in engagement with the ampoule retaining means, a reciprocatory bar engaging with the opposite end of said arm and with said air jet cutting off means and rotary driven means engaging with said reciprocatory bar for actuating the same to cut off said jet of air.

4. In a machine for sealing filled ampoules made of a fusible material, means for supporting and retaining the ampoule in fixed position, a nozzle opening toward said ampoule for directing a flame in surrounding relation to the neck thereof, a conduit having an opening directed toward the path of the flame adapted to direct a jet of air for intercepting and discontinuing the application of the flame to the neck of the ampoule, means for cutting off the supply of the air passing through said conduit, a swingably mounted arm disposed with one end thereof in engagement with the ampoule retaining means, a reciprocatory bar engaging with the opposite end of said arm and with said air jet cutting off means, movable jaws for compressing the neck of said ampoule while in a plastic state to sever and seal the same, a rock shaft operatively connected with said movable jaws for moving the same and rotary driven means engaging with said reciprocatory bar and said rock shaft for actuating the same to thereby discontinue the application of the flame to sever and seal the ampoule.

5. In a machine for sealing filled ampoules made of a fusible material, means for supporting the ampoule in fixed position, a nozzle opening toward said ampoule for directing a flame in surrounding relation to the neck thereof, a conduit having an opening directed toward the path of the flame adapted to direct a jet of air for intercepting and discontinuing the application of the flame to the neck of the ampoule, means for cutting off the supply of air passing through said conduit, a spring finger disposed in engagement with the ampoule neck, a swingably mounted arm arranged with one end thereof in engagement with the said spring finger for disposing the outer end of said arm in a position relative to the size of the ampoule neck, a reciprocatory bar engaging with said air jet cutting off means and adapted to engage the outer end of said arm and driving means for moving said bar for effecting a cutting off of the jet of air and thereby controlling the length of time that the flame jet is applied to the ampoule by the relative size of the ampoule neck.

ALF PIPPING.